United States Patent
Gauthier et al.

(10) Patent No.: US 7,341,312 B2
(45) Date of Patent: Mar. 11, 2008

(54) FOLDABLE HEAD RESTRAINT

(75) Inventors: Jeremy J. Gauthier, Kalamazoo, MI (US); Robert R. Sutter, Jr., Belmont, MI (US); Craig A. Ulman, Rockfrod, MI (US)

(73) Assignee: Gill Industries, Inc., Grand Rapids, MI (US)

( * ) Notice: Subject to any disclaimer, the term of this patent is extended or adjusted under 35 U.S.C. 154(b) by 0 days.

(21) Appl. No.: 11/177,620

(22) Filed: Jul. 8, 2005

(65) Prior Publication Data

US 2006/0061187 A1      Mar. 23, 2006

Related U.S. Application Data

(63) Continuation-in-part of application No. 10/633,770, filed on Aug. 4, 2003, now Pat. No. 6,935,696.

(51) Int. Cl.
*A47C 7/36* (2006.01)

(52) U.S. Cl. .................................. 297/408

(58) Field of Classification Search .............. 297/408, 297/403, 391
See application file for complete search history.

(56) References Cited

U.S. PATENT DOCUMENTS

| | | | |
|---|---|---|---|
| 2,976,915 A | 3/1961 | Spound | |
| 2,984,293 A | 5/1961 | Bontempi et al. | |
| 3,065,029 A | 11/1962 | Spound et al. | |
| 3,695,700 A | 10/1972 | Flach | |
| 4,351,563 A * | 9/1982 | Hattori | 297/408 |
| 4,353,595 A | 10/1982 | Kaneko et al. | |
| 4,576,401 A | 3/1986 | Harrison | |
| 4,576,413 A * | 3/1986 | Hatta | 297/408 |
| 4,600,240 A | 7/1986 | Suman et al. | |
| 4,682,817 A | 7/1987 | Freber | |
| 4,761,034 A * | 8/1988 | Saito | 297/408 |
| 4,830,434 A | 5/1989 | Ishida et al. | |
| 5,011,225 A * | 4/1991 | Nemoto | 297/408 |
| 5,026,120 A | 6/1991 | Takeda et al. | |
| 5,145,233 A | 9/1992 | Nagashima | |
| 5,181,758 A | 1/1993 | Sandvik | |
| 5,346,277 A | 9/1994 | Holobaugh et al. | |
| 5,492,386 A | 2/1996 | Callum | |
| 5,590,933 A * | 1/1997 | Andersson | 297/408 |
| 5,642,918 A | 7/1997 | Sakamoto et al. | |
| 5,681,079 A | 10/1997 | Robinson | |

(Continued)

FOREIGN PATENT DOCUMENTS

GB       2319468 A  *  5/1998

*Primary Examiner*—Sarah B. McPartlin
(74) *Attorney, Agent, or Firm*—Butzel Long

(57) ABSTRACT

A foldable head restraint has two head restraint supports set within a bracket. A latch is made integral with at least one of the head restraint supports. The latch rests against a stop to prohibit rotation of the head restraint support in a first direction. The latch rests against a rotational cam to prohibit movement of the head restraint support in a second direction. By rotating the cam, the head restraint support may be folded. In another embodiment, an articulating head restraint could also include an armature with a cam. The cam has a lock acumination and a stop acumination. The lock acumination engages a slide to prevent movement of the head restraint in one direction, and the stop acumination engages a bracket to prevent movement in the other direction.

11 Claims, 9 Drawing Sheets

U.S. PATENT DOCUMENTS

| | | |
|---|---|---|
| 5,738,411 A | 4/1998 | Sutton et al. |
| 5,826,942 A | 10/1998 | Sutton et al. |
| 5,913,570 A | 6/1999 | Yoshida et al. |
| 5,927,804 A | 7/1999 | Cuevas |
| 6,024,405 A | 2/2000 | MacAndrew et al. |
| 6,045,181 A * | 4/2000 | Ikeda et al. ............ 297/216.12 |
| 6,050,633 A | 4/2000 | Droual |
| 6,068,337 A * | 5/2000 | De Filippo ................. 297/391 |
| 6,074,011 A * | 6/2000 | Ptak et al. .................. 297/408 |
| 6,192,565 B1 * | 2/2001 | Tame .......................... 297/61 |
| 6,371,559 B1 | 4/2002 | Kienzle |
| 6,375,264 B1 | 4/2002 | Kienzle |
| 6,485,096 B1 * | 11/2002 | Azar et al. .................... 297/61 |
| 6,499,805 B1 * | 12/2002 | Watadani .................... 297/408 |
| 6,517,156 B1 | 2/2003 | Lin |
| 6,612,653 B2 | 9/2003 | Takata |
| 6,702,385 B2 | 3/2004 | Holdampf et al. |
| 6,761,548 B1 | 7/2004 | Snop |
| 2001/0054837 A1 | 12/2001 | O'Connor |
| 2002/0084686 A1 * | 7/2002 | Takata ........................ 297/408 |
| 2003/0234567 A1 | 12/2003 | O'Connor |
| 2005/0225146 A1 * | 10/2005 | Sutter et al. ................ 297/408 |

* cited by examiner

FOLDABLE HEAD RESTRAINT

RELATED APPLICATION

This application is a continuation-in-part of U.S. application Ser. No. 10/633,770, which was filed on Aug. 4, 2003, now U.S. Pat. No. 6,935,696. This application also claims priority to U.S. application Ser. No. 10/797,294, which was filed on Mar. 10, 2004.

BACKGROUND OF THE INVENTION

The invention relates generally to vehicle head restraints and more particularly to foldable vehicle head restraints.

Head restraints protect a vehicle occupant from serious injury due to sudden movement of the vehicle. The head restraints generally extend upward from the seat.

While the head restraints are necessary to insure the safety of passengers, at times the head restraints can present difficulties. Head restraints can obstruct the driver's view when looking rearward. If a seat is folded forward to allow a passenger to enter the rear portion of a vehicle, the head restraint may contact an object in front of the seat thus stopping the seat from fully folding down. In vehicles with seats that fold flat into the floor, the head restraint must be removed or additional stowage space in the floor of the vehicle must be provided.

A foldable head restraint has been described in U.S. patent application Ser. No. 10/672,703, assigned to the assignee of this patent application. A foldable head restraint has a design position where the head restraint is generally upright and serves as protection for a vehicle passenger. The foldable head restraint also has a folded position, where the head restraint is rotated to allow complete kinematic movement of the seatback, or to increase rearward visibility.

While foldable head restraints offer advantages over non-foldable head restraints, foldable head restraints are generally more difficult to assemble and therefore relatively more expensive. A foldable head restraint which is easier to manufacture and less expensive is thus desirable.

SUMMARY OF THE INVENTION

The aforementioned problems are overcome in the present invention. An articulating head restraint with minimal free-play includes an armature. A pair of rods extending from the armature are configured to hold a bun.

A first end of the armature is inserted through a bracket hole. The second end of the armature is inserted through a hole in a slave bracket. The slave bracket is then attached to the bracket. Because the armature is inserted into the bracket and the slave bracket before the slave bracket is attached to the bracket, the diameter of the holes in both the bracket and the slave bracket can be near the size of the diameter of the armature, or even be made to accommodate a line to line fit condition. Thus, lateral movement of the armature within the bracket and slave bracket is minimized.

Further, the articulating head restraint includes a torsion spring. A cam is positioned about the armature. The cam has a stop acumination and a lock acumination. The stop acumination and the lock acumination work in coordination with a slide. The slide moves laterally so as to become in contact with the lock acumination. The wedging action of the slide and lock acumination prohibit rotation of the armature.

A cable is attached to the slide. If a force is exerted on the cable, the slide will translate away from the lock acumination, allowing the cam to rotate, and thereby allowing the armature to rotate. The torsion spring causes the armature to rotate in a first direction. The stop acumination on the cam is positioned to prohibit excessive rotation of the armature in a second direction.

Because the cam, the acuminations on the cam, and the slide can be manufactured to a high degree of precision, the interaction of the lock acumination with the slide are exacting. Free play of the head restraint mechanism is thereby minimized, resulting in a solid feel and an ergonomically pleasing head restraint.

Further, a foldable head restraint has two head restraint supports set within a bracket. The head restraint supports are comprised of a metal substrate and a section of an over-molded geometry. The over-molded geometry is generally plastic. A latch is made integral with the metal substrate. The latch rests against a stop to prohibit rotation of the head restraint support in a first direction and rests against a rotational cam to prohibit movement of the head restraint supports in a second direction. A user rotates the cam to an open position to allow the head restraint supports to be pivoted to a folded position. To reduce the size of the slots in the seatback which are often provided to accommodate foldable head restraints, the head restraint supports have a general shape of a "J". Other shapes and configurations are possible.

The metal substrate of the head restraint supports could be fine blanked, precision stamped, or manufactured by a close tolerance metal fabrication process thereby significantly reducing the cost of the head restraint support. The metal substrate can then be over-molded. The over-molded shape and cross-section can be varied as needed to allow mating of the head restraint supports with components found in the head restraint bun.

The head restraint supports for the primary side and the secondary side of the head restraint are identical, allowing for ease of mass production. Also, due to the geometry of the metal substrate and over-molded geometry the package size of the head restraint supports is more compact when compared to similar mechanisms.

These and other objects, advantages, and features of the invention will be more readily understood and appreciated by reference to the detailed description of the drawings.

DETAILED DESCRIPTION OF THE DRAWINGS

Figure 1:
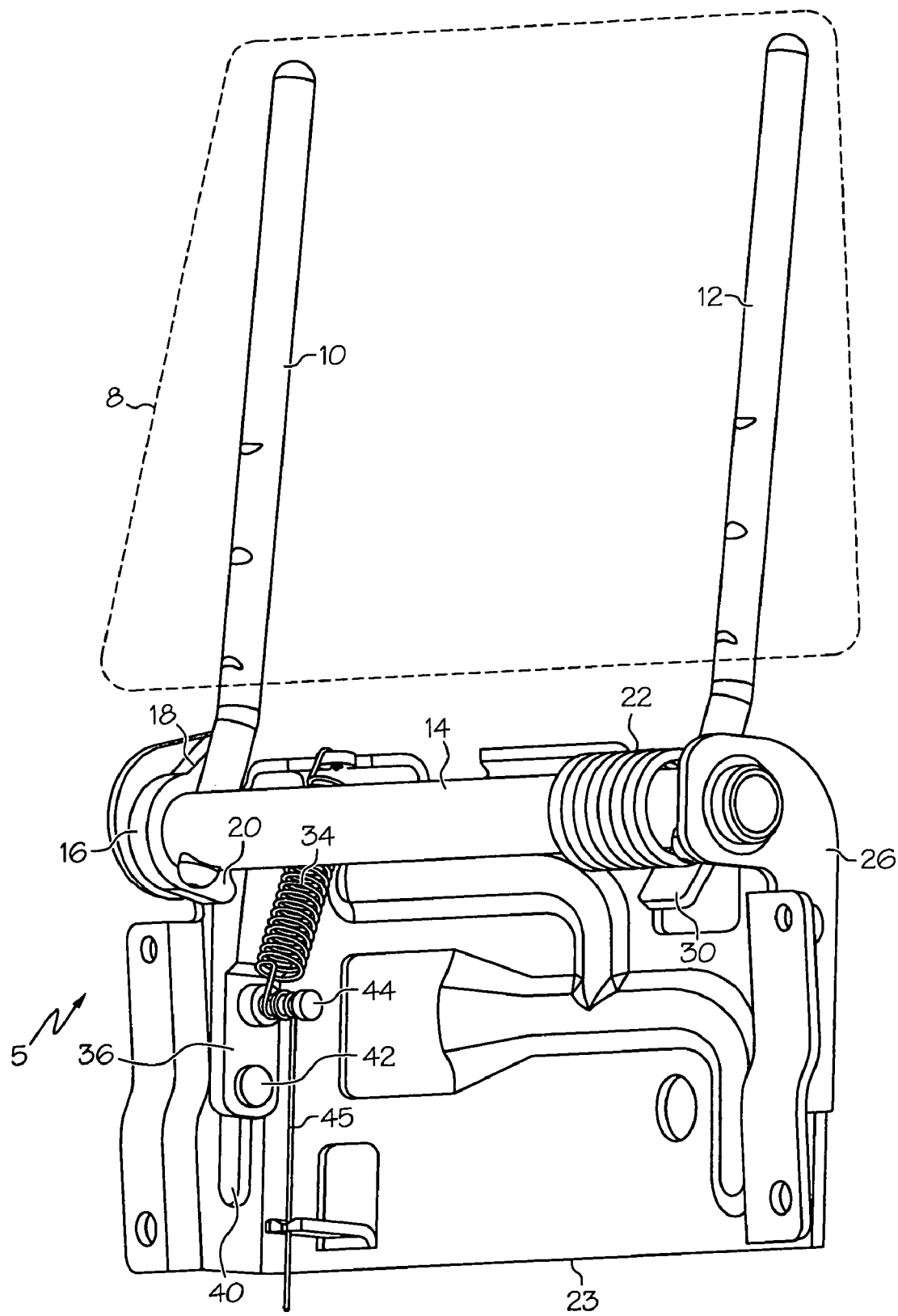
FIG. 1 is a view of an articulating head restraint mechanism.

FIG. 1 is a view of an articulating head restraint mechanism. A bun fits around first rod 10 and second rod 12. Rods 10, 12 are connected to armature 14. Armature 14 is rotatable. Cam 16 is connected to armature 14.

Cam 16 contains stop acumination 18 and lock acumination 20. Cam 16 is preferably constructed by a close tolerance processes from material suitable for the applied loads, providing cam 16 with a highly finished surfaces, especially the lock acumination 20.

Cam 16 is located on armature 14 and outside of first rod 10. Torsion spring 22 is circumferentially disposed about armature 14 and between first rod 10 and second rod 12 and near second rod 12.

Figure 2:
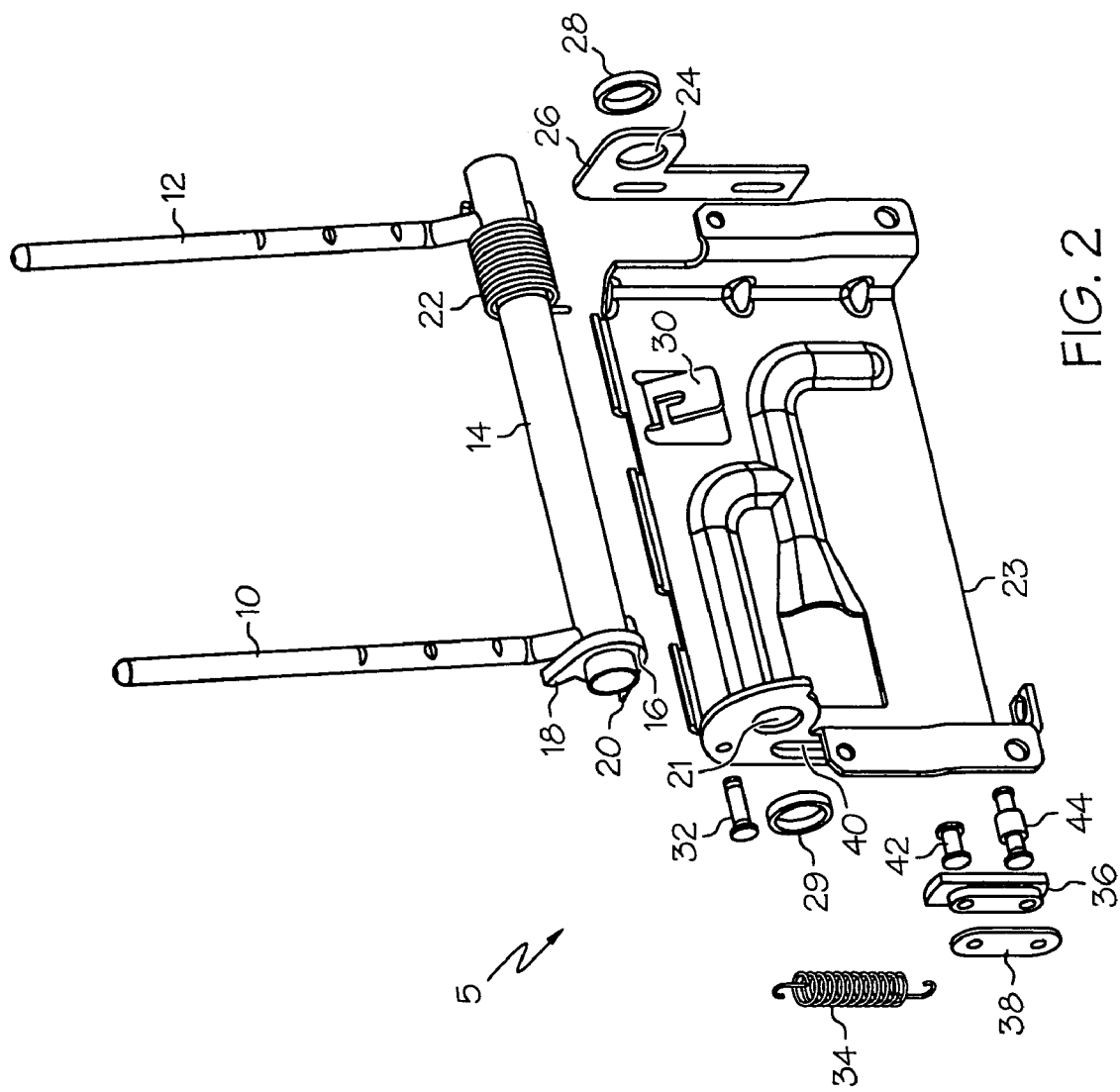
FIG. 2 is an exploded view of the articulating head restraint mechanism.

FIG. 2 is an exploded view of articulating head restraint mechanism 5.

One end of annature 14 fits within bracket hole 21 of bracket 23, while the other end of armature 14 fits within slave bracket hole 24 of slave bracket 26. First Teflon bearing 28 fits within slave bracket hole 24m while second Teflon bearing 29 fits within bracket hole 21.

Armature 14 is placed within bracket 23 by first aligning armature 14 with bracket hole 21 and inserting one end of armature 14 within bracket hole 22. The other end of armature 14 is placed within slave bracket hole 24. Slave bracket 26 is then affixed to bracket 23. In this manner, slave bracket hole 24 can have a diameter only slightly larger than the diameter of armature 14. Since Teflon bearing 28 fits within slave bracket hole 24 and Teflon bearing 28 fits within bracket hole 21, the free play of annature 14 is minimized, causing the head restraint to have a solid feel. When bearings are installed, the armature has a line-to-line fit with the pivot holes.

One end of torsion spring 22 is attached to tab 30 in bracket 23. The second end of torsion spring 22 is attached to second rod 12. Torsion spring 22 is configured so that it is wound as armature 14 is rotated toward the design position and unwound as armature 14 is rotated toward the stowed position.

Stop rivet 32 extends through bracket 23. Stop rivet 32 is positioned such that stop acumination 18 will firmly contact stop rivet 32 and prevent rotation of armature 14 beyond the design position.

One end of coil spring 34 is attached to cable rivet 44 while the other end of coil spring 34 is attached to bracket 23. Slot 40 extends within bracket 23. On the inside of bracket 23 and immediately proximal to slot 40 is slide 36. Slide 36 is attached to washer 38 by rivet 42 and cable rivet 44.

Cable rivet 44 is similar to rivet 42. However, cable rivet 44 is elongated so that slide coil spring 34 may be attached to cable rivet 44. Additionally, cable 45 is attached to cable rivet 44.

In an alternative embodiment, a second cam could be provided on the armature on the side opposite the previously described cam. A stop pin would be attached to the bracket. This would provide additional support to the head restraint when it was in the design position.

Figure 3:
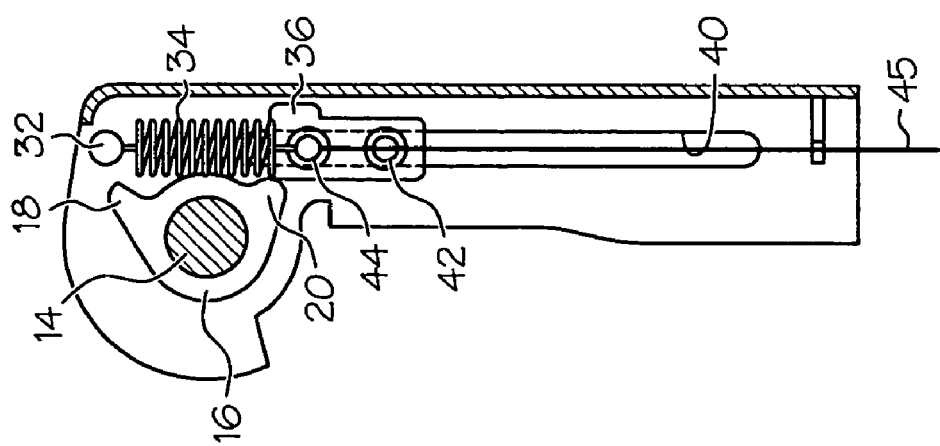
FIG. 3 is a side view of the locking mechanism of the articulating head restraint mechanism in the locked position.

FIG. 3 is a view of the looking mechanism of the head restraint 5 when head restraint 5 is in the design position. Slide 36 is at the top of slot 40 in the locked position. Lock acumination 20 of cam 16 pushes against slide 36. Torsion spring is exerting a counterclockwise torque on armature 14, forcing lock acumination 20 into slide 36. The opposite side of slide 36 is thereupon forced into bracket 23. Lock acumination 20 and slide 36 are of such material and size so as to stop any movement of slide 36 absent any force on cable 45. Preferably, cam 16 and slide 36 are made from close tolerance processes out of material suitable for the applied loads. Slide 36 is approximately 5 mm to 10 mm wide. Lock acumination 20 is preferable of a width of about 5 mm to 10 mm.

As can be seen from FIG. 3, if armature 14 is rotated clockwise, stop acumination 18 will encounter stop rivet 32. Further rotation of armature 14 is thereby prohibited.

When sufficient force is exerted by cable 45 on slide 36, then slide 36 will translate in slot 40 until lock acumination is no longer above slide 36. At that time, torsion spring 22 will cause armature 14 to rotate so that rods 10, 12 assume the stowed position.

Figure 4:
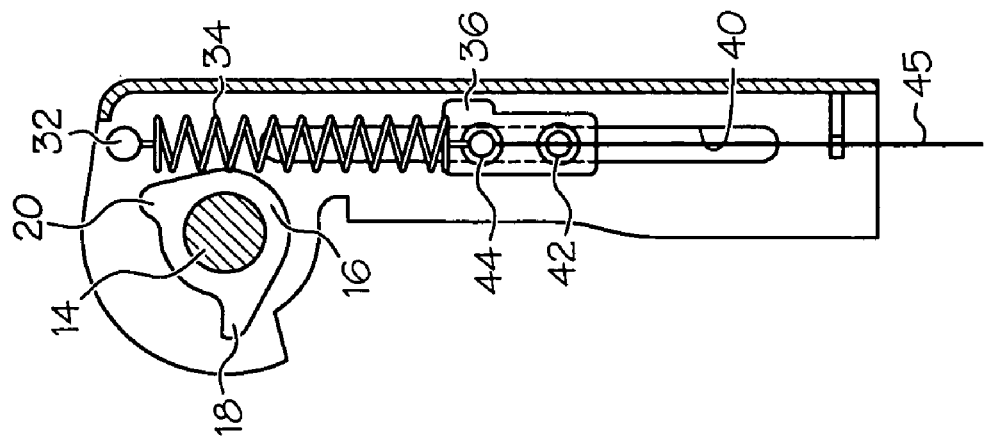
FIG. 4 is a side view of the locking mechanism of the articulating head restraint mechanism in the unlocked position.

FIG. 4 shows the head restraint mechanism in the stowed position. Cam 16 has rotated into the desired folded position. Slide 36 has moved down slot 40 into an unlocked position. At this time, coil spring 34 is exerting a force on slide 36 tending to return slide 36 to the locked position.

When the tension is reduced on cable 45, then slide 36 will translate upward to its former position. At that time, a force can be exerted on rods 10, 12 by a user or by some other mechanical means to return armature 14 to its locked position and the head restraint to its design position.

The use of the locking mechanism in the head restraint improves the overall feel of the head restraint. Additionally, due to the method of constructing the head restraint, there is very little lateral motion of the head restraint. The head restraint therefore has little free play. The lack of free play gives the head restraint a solid appearance and feel, thereby increasing the functionality and visual appeal of the head restraint.

Figure 5:
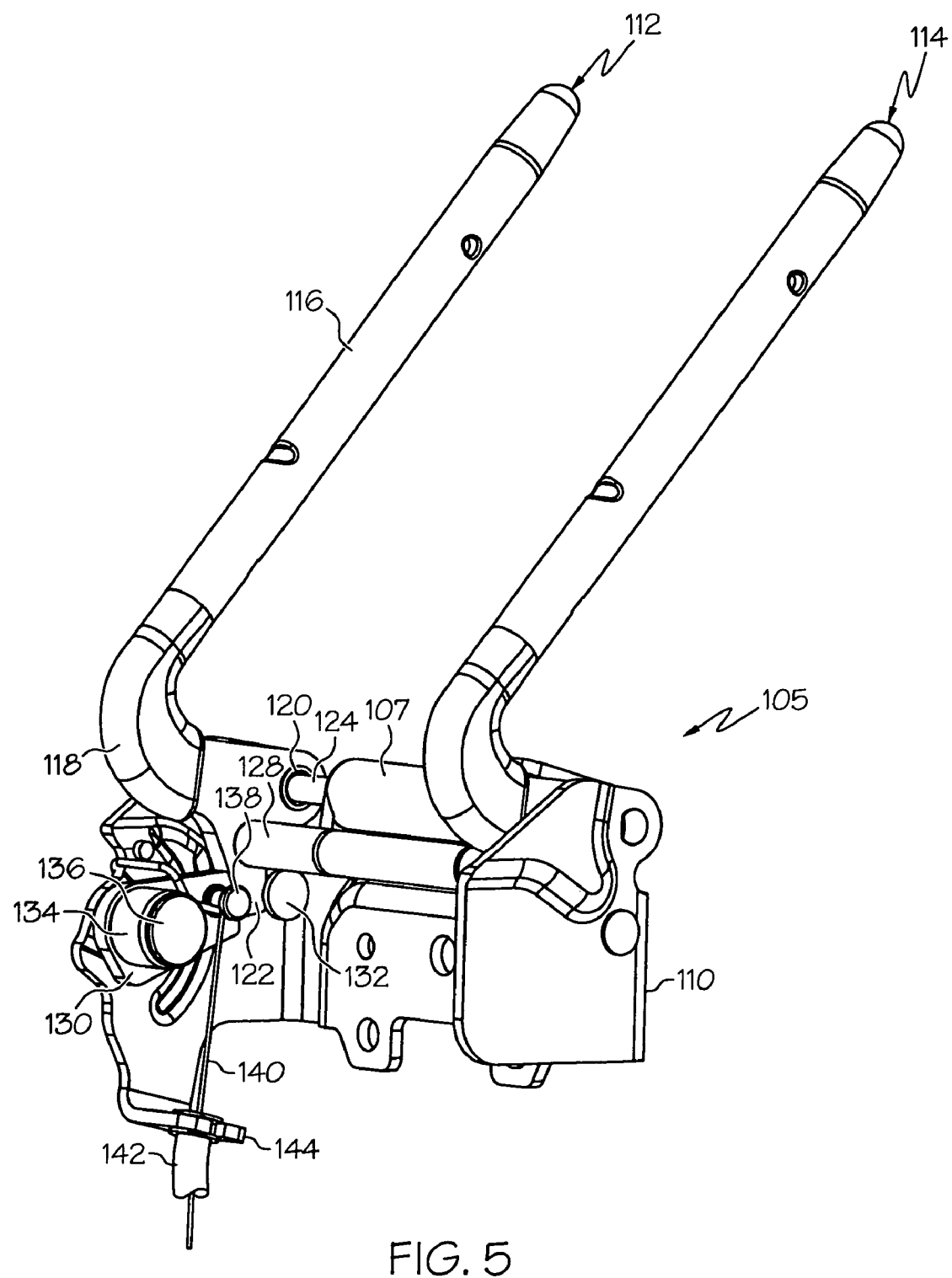
FIG. 5 is a perspective view of the primary side of the foldable head restraint.
Figure 5A:
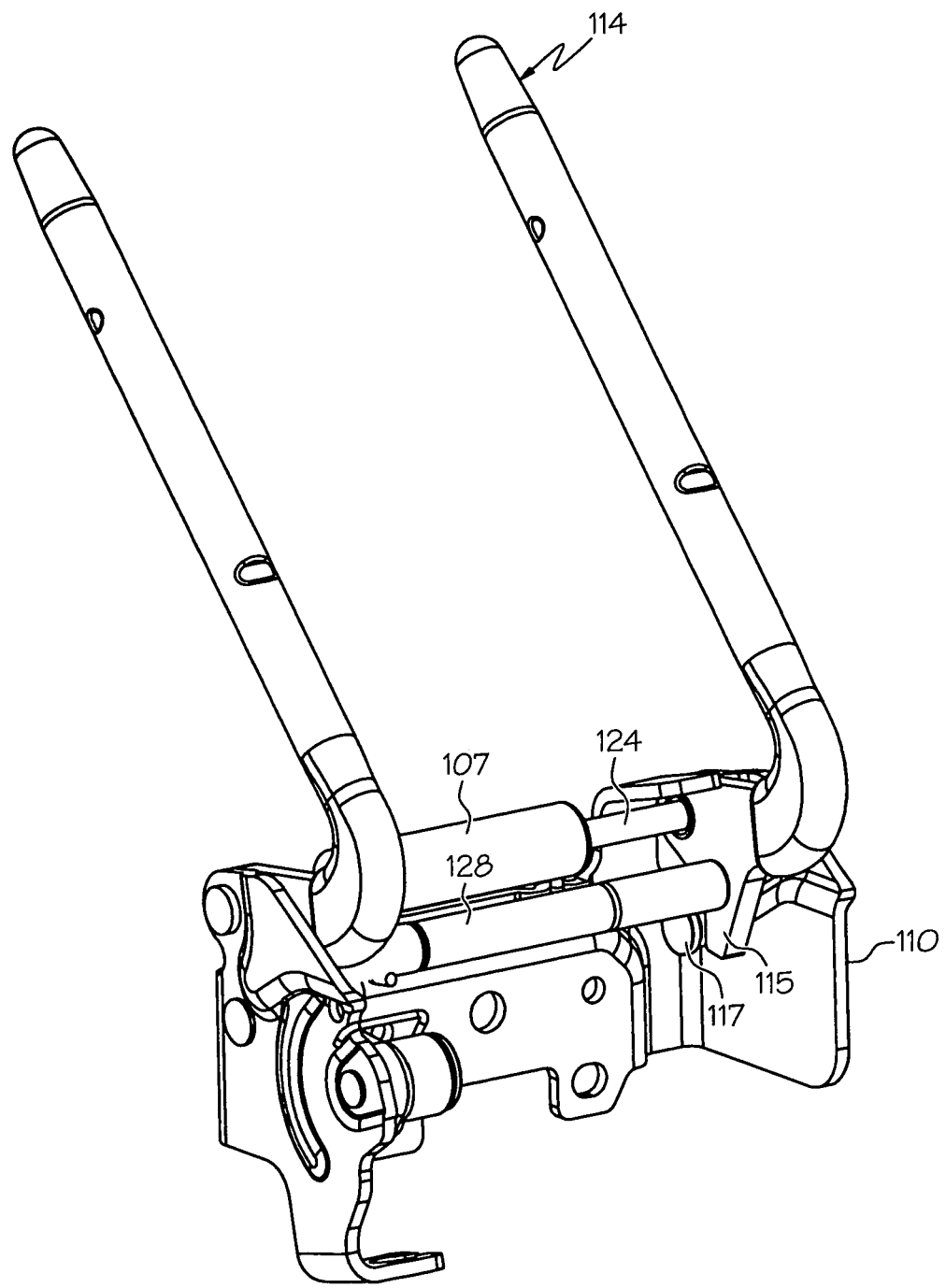
FIG. 5A is another perspective view of the secondary side of the foldable head restraint.

FIG. 5 shows foldable head restraint 105 viewing the primary side of foldable head restraint 105. Head restraint 1105 includes bracket 110. Two head restraint supports 12, 14 are attached to bracket 110 and are rotatable within bracket 110. A bun is usually provided on head restraint supports 112, 114. FIG. 5A shows a view of the secondary side of head restraint 105. Head restraint support 114 also contains latch 122. Bracket 110 also includes stop pin 132 and stop pin 117.

Figure 6:
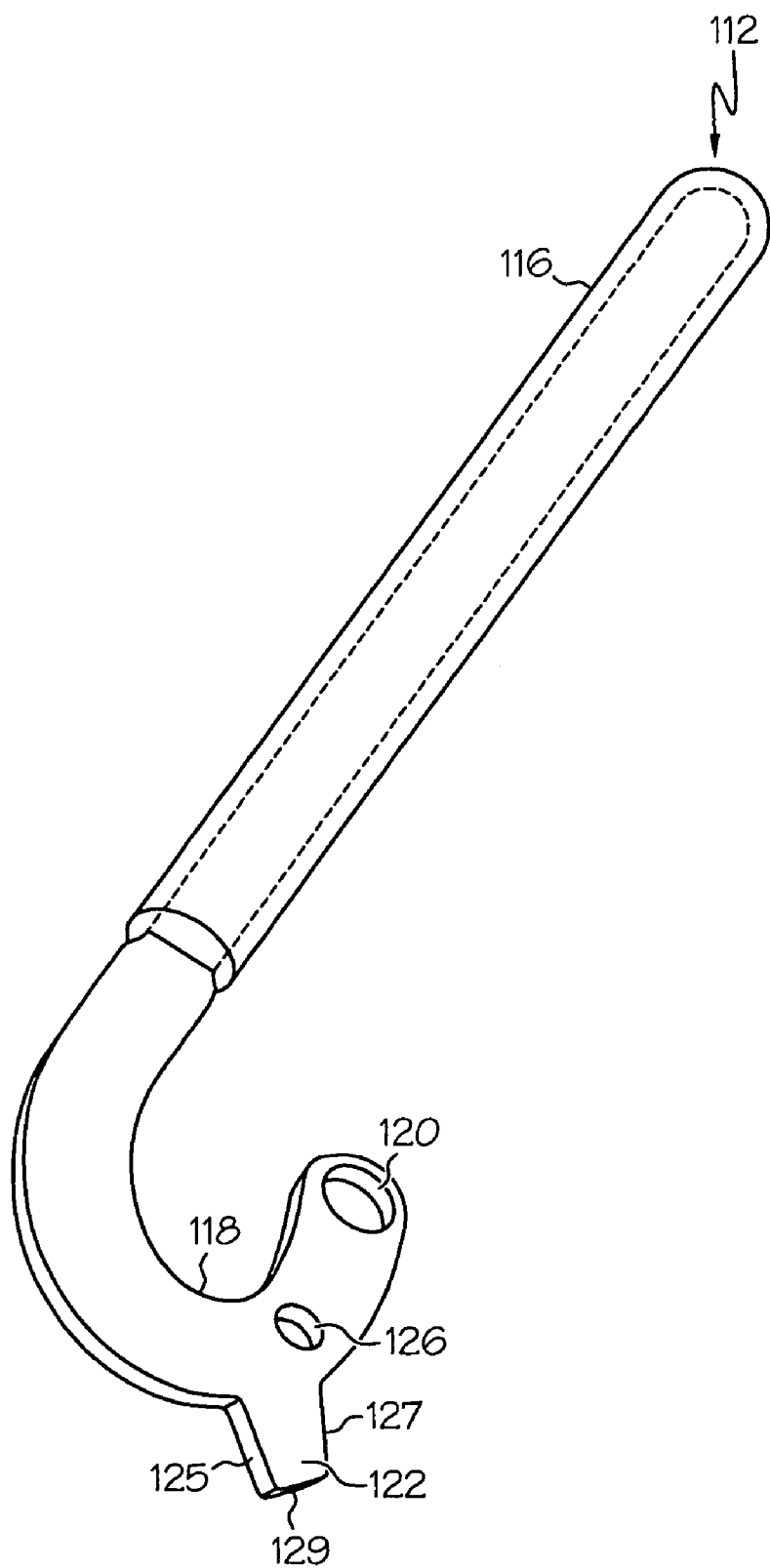
FIG. 6 shows a head restraint support used within the foldable head restraint.

FIG. 6 shows head restraint support 112. (Head restraint support 114 is identical in construction to head restraint support 112.) Over-molded geometry 116 of head restraint support 112 is attached to metal substrate 118. Over-molded geometry 116 is usually contained within a head restraint bun. Metal substrate 118 of head restraint support 112 includes pivot hole 120. Pivot hole 120 is configured so as to be capable of receiving pivot shaft 124, shown in FIG. 5. Rotational torsion spring 107 is placed about the middle of pivot shaft 124. Stabilizer hole 126 is configured so as to be capable of receiving stabilizer shaft 128, as shown in FIG. 5. Latch 122 protrudes from metal substrate 118. FIG. 6 shows surface 125, surface 127, and surface 129 of latch 122.

As shown in FIG. 5, latch 122 interacts with rotational cam 130 and stop pin 132 to provide the unique folding ability of head restraint 105. Rotational cam 130 has cam torsion spring 134 installed in a preloaded condition on cam pin 136. One end of cam torsion spring 134 is held by cable pin 138. Cam pin 136 and cable pin 138 are located on cam 130. The other end of cam torsion spring 134 is attached to bracket 110.

Cable wire 140 is also attached to cable pin 138. Cable wire 140 is part of cable 142. One end of cable 142 is attached to cable termination 144, which is normally integral to bracket 110. The other end of cable 142 may be attached to the vehicle body or to some other device, such as a manual release lever, in order to actuate the folding mechanism of head restraint 105.

Figure 7:
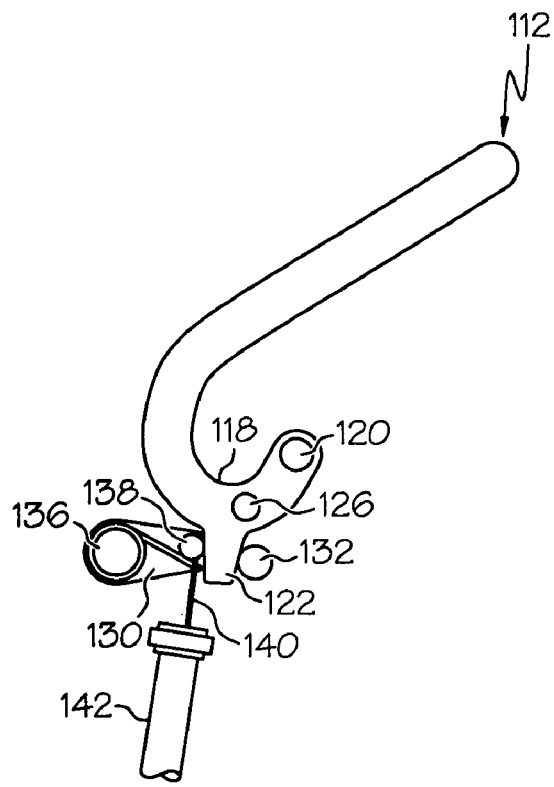
FIG. 7 is a side view of the foldable head restraint in the design position.

FIGS. 3, 4 and 5 show the operation of the head restraint. FIG. 7 is a side view showing the head restraint in the design, or upright, position. Rotational cam 130 holds latch 122 securely against stop pin 132. Stop pin 132 is engaged with latch surface 127. The end of rotational cam 130 and latch surface 125 are generally designed such that when head restraint 105 is in the design position, there is firm engagement between the two, thereby minimizing chuck.

Figure 8:
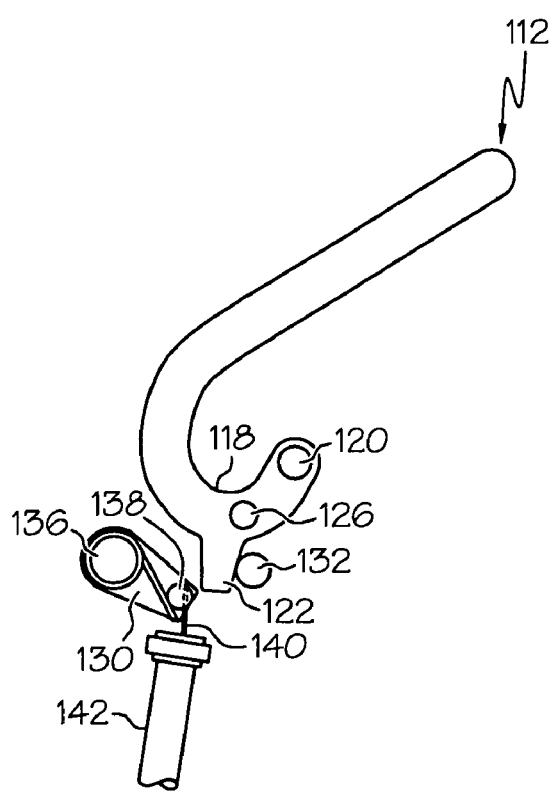
FIG. 8 is a side view of the foldable head restraint as the cam is being disengaged from the rotational lock.

FIG. 8 is a side view showing the head restraint after sufficient tension has been exerted on cable wire 140 to move rotational cam 130. When sufficient tension is exerted on cable wire 140, cable pin 138 is pulled downward toward cable termination 144, causing rotational cam 130 to rotate. When rotational cam 130 has rotated sufficiently, latch 122 is no longer held against stop pin 132. Thus, head restraint supports 112, 114 are free to rotate toward the folded position.

The angle of head restraint supports 112, 114 relative to a vertical plane can be selected such that head restraint supports 112, 114 will immediately rotate toward the folded position when rotational cam 130 has rotated sufficiently to free latch 122 due to the force exerted on head restraint supports 112, 114 by torsion spring 107. Alternatively, the head restraint 105 could be designed such that some other force would need to be applied to head restraint supports 112, 114 to cause head restraint supports 112, 114 to rotate to the folded position.

Figure 9:
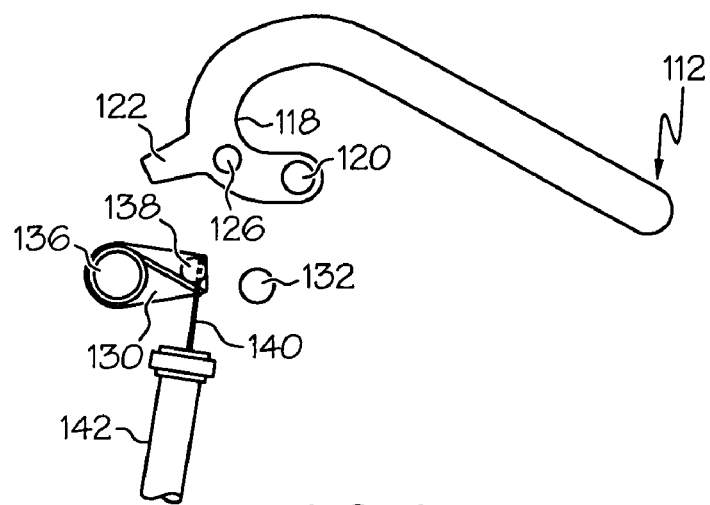
FIG. 9 is a side view of the foldable head restraint in the folded position.

FIG. 9 shows head restraint 105 in the folded position. In the folded position head restraint supports 112, 114 are near horizontal. Thus, the head restraint is neither a visual obstruction nor an obstruction during the kinematic movement of the seat. When tension is no longer applied to wire 140, torsion spring 134 causes rotational cam 130 to return to a position that will enable it to reengage the lock on latch 122.

Figure 10:
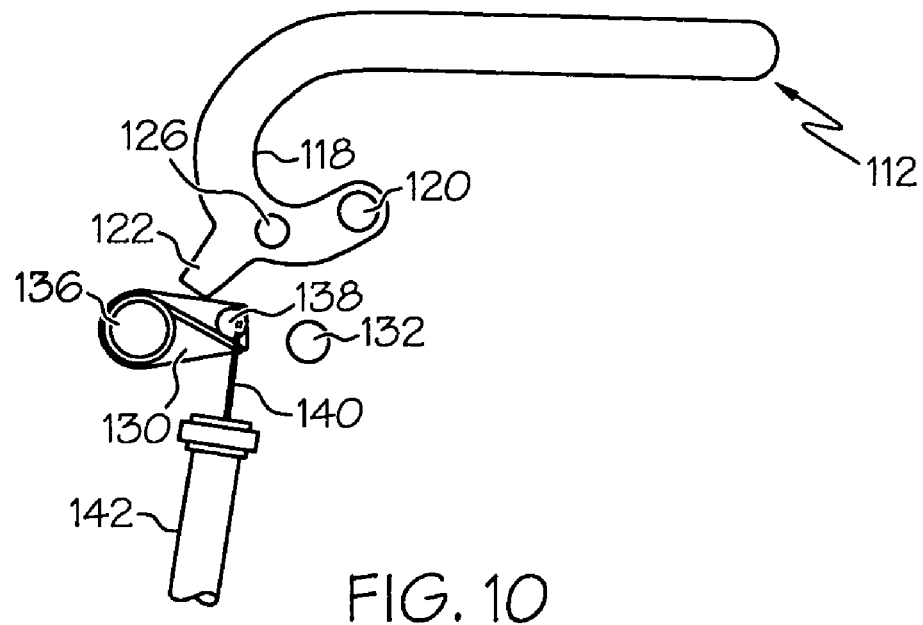
FIG. 10 is a side view of the foldable head restraint when it first contacts the rotational cam when returning to the design position.

To return head restraint 105 to the design position, a force is applied on head restraint supports 112, 114 usually through the head restraint bun. Head restraint support 112 rotates until latch 122 strikes rotational cam 310. Referring again to FIG. 10, continued force applied to head restraint support 112 causes rotational cam 130 to rotate clockwise.

Figure 11:
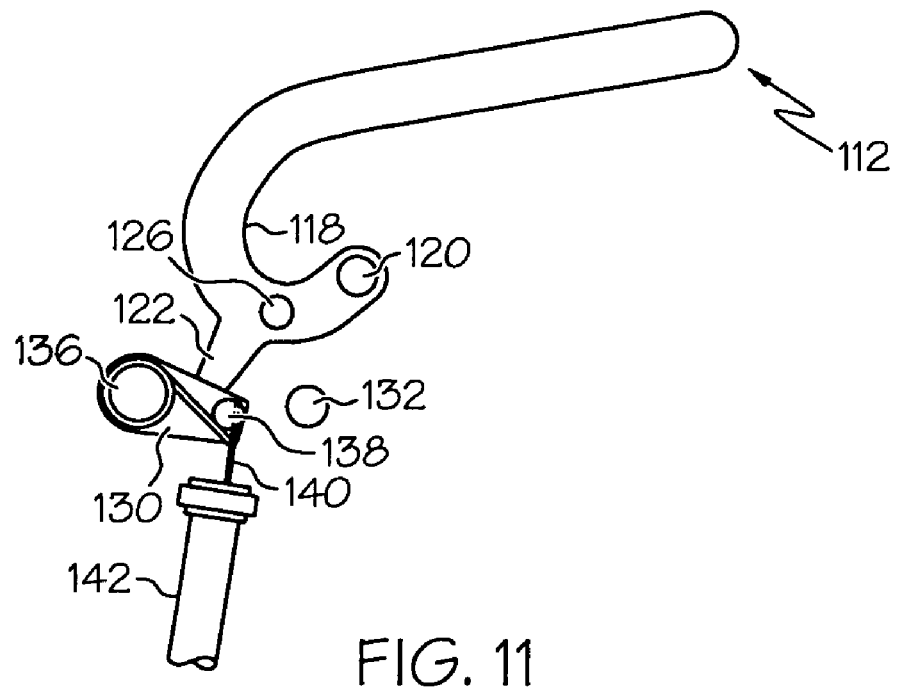
FIG. 11 is a side view of the foldable head restraint before it returns to the design position.

FIG. 11 shows the position of head restraint 105 just prior to returning to the design position. Rotational cam 130 has been rotated, causing latch surface 129 to be in contact with rotational cam 130. At this position, latch surface 129 is constructed such that it will allow the rotational cam 130 to clear the path of the rotating latch 122.

When a further force is applied to head restraint support 112, latch surface 129 causes rotational cam 130 to rotate further so that latch 122 can come to rest against stop pin 132. Due to the configuration of the surfaces of latch 122, head restraint support 112 is then locked into the design position by contact between rotational cam 130 and latch surface 125.

Metal substrate 118 can be fine blanked, precision stamped, or close tolerance metal fabricated component, and would preferably be made of a high strength steel. Metal substrate 118 can be over-molded. By varying the design of the over-molded geometry, head restraint support 112 could easily mate with a variety of head restraint buns. Rotational rod 124 and stabilizer shaft 128 are usually steel rods.

Bracket 110 is usually contained within a seat back. Head restraint supports 112, 114 extend through the top of the seat back through a pair of slots. In order to minimize the size of these slots, head restraints supports 112, 114 have the shape of a "J". Other shapes can be used for head restraint supports 112, 114 depending upon the particular application.

Assembly of head restraint 105 is simple. Head restraint supports 112, 114 are first joined by stabilizer shaft 128, and this assembly is then placed within bracket 110. Rotational rod 124 is inserted through bracket 110 and through head restraint supports 112, 14.

Figure 13:
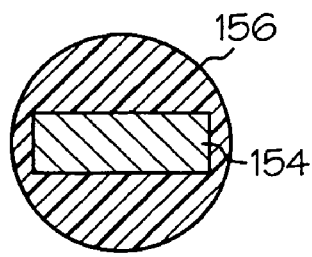
FIG. 13 is a cross-section of the foldable head restraint support.
Figure 12:
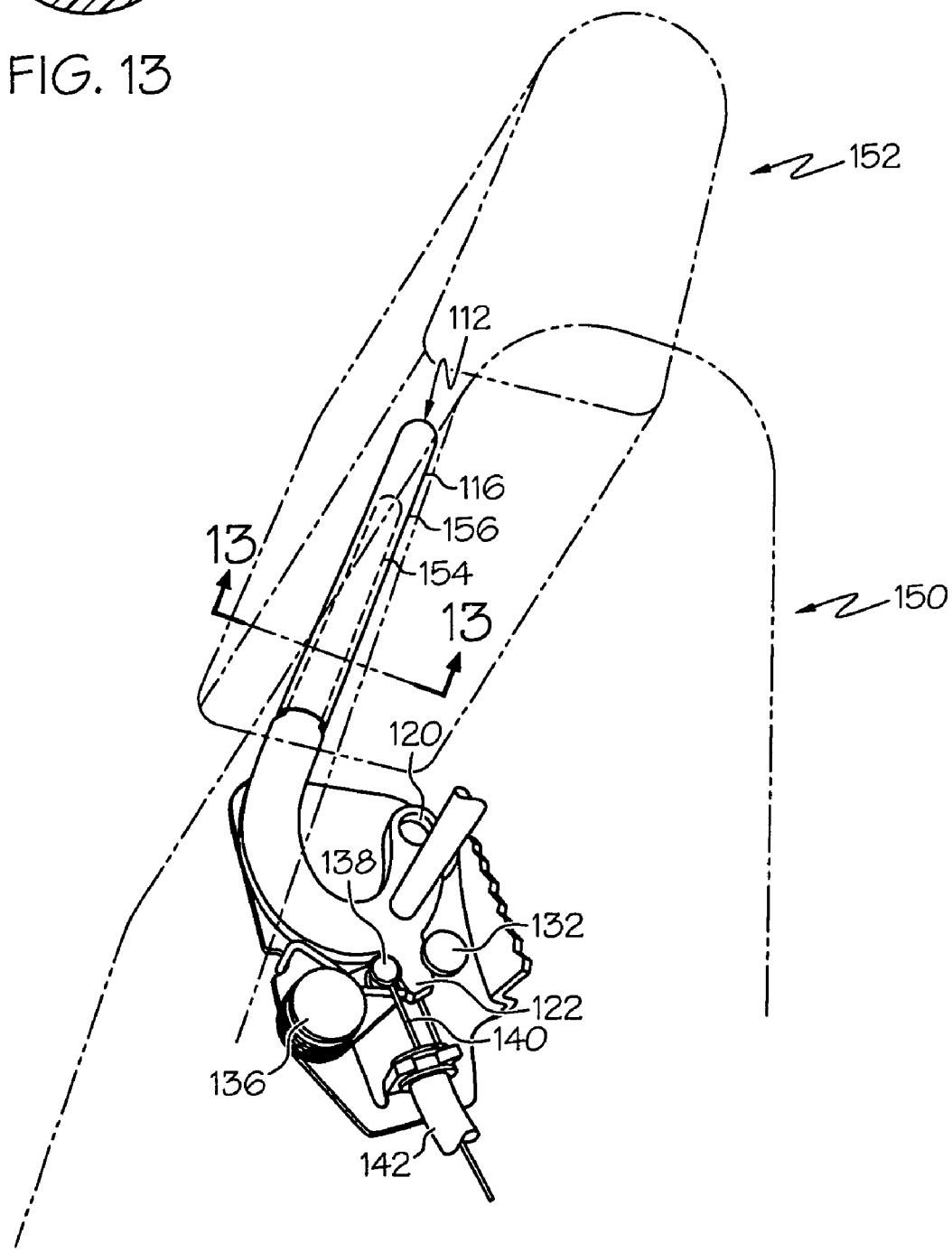
FIG. 12 is a side view of the foldable head restraint contained within a seat and a bun.

FIG. 12 shows head restraint 105 contained within seat 150 and bun 152. FIG. 13 shows a cross-section of rod 116 at 13-13. Rod 116 is shown having steel portion 154 with plastic over-molding 156. The cross-section of steel portion 154 is generally rectangular and the cross-section rod 16 when fitted with over-molding 156 is generally circular, although other shapes may be utilized with the same intent and functionality.

The above description is of the preferred embodiment. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The embodiments of the invention in which an exclusive property or privilege is claimed are defined as follows:

1. An articulating head restraint comprising:
    a bracket, the bracket having a slot and a stop;
    an armature contained within the bracket;
    a cam having a lock mechanism and a stop acumination, the cam fixedly attached to the armature; and
    a slide attached to the bracket, the slide movable within the slot to a locked position so that, when the slide is in the locked position, the lock acumination is in contact with the slide thereby preventing rotation of the armature in a first direction and the stop acumination is positioned to contact the stop to prevent rotation of the armature beyond the stop in a second direction.

2. The articulating head restraint of claim 1 where the slide has an unlocked position such that when the slide is in the unlocked position, the lock acumination is not in contact with the slide.

3. The articulating head restraint of claim 2 wherein the armature is capable of rotating between a design position and a folded position, and wherein a portion of the cam contacts the slide to move the slide from the locked position as the annature is rotated from the folded position to the design position.

4. The articulating head restraint of claim 3 further comprising at least one rod for attaching a bun.

5. The articulating head restraint of claim 4 further comprising a coil spring attached to the bracket and to the slide and configured so as to tend to pull the slide to the locked position.

6. The articulating head restraint of claim 5 further comprising a cable, the cable attached to the slide and configured such that a force applied to the cable will tend to pull the slide to the unlocked position.

7. An articulating vehicle head restraint comprising:
a bracket including a stop;
an armature contained within the bracket;
a cam having a lock acumination, the cam fixedly attached to the armature;
a movable locking element for selective engagement with the lock acumination to wedge the lock acumination between the locking element and the stop, preventing any rotation of the armature;
a rod for attaching a bun, the rod attached to the armature; and
a first spring for urging the movable locking element into engagement with the lock acumination.

8. The articulating vehicle head restraint of claim 7 were the rod includes an over-molded geometry.

9. The articulating vehicle head restraint of claim 8 where the cam is attached to the rod.

10. The articulating vehicle head restraint of claim 9 further comprising a cable attached to the movable locking element and configured such that a force applied to the cable will tend to disengage the movable locking element from the lock acumination.

11. The articulating vehicle head restraint of claim 10 where a torsion spring is positioned proximal to the rod.

* * * * *

UNITED STATES PATENT AND TRADEMARK OFFICE
CERTIFICATE OF CORRECTION

PATENT NO. : 7,341,312 B2  Page 1 of 1
APPLICATION NO. : 11/177620
DATED : March 11, 2008
INVENTOR(S) : Jeremy J. Gauthier, Robert R. Sutter, Jr. and Craig A. Ulman It is certified that error appears in the above-identified patent and that said Letters Patent is hereby corrected as shown below:

Column 3,
Line 41, should be changed from
"within bracket hold 21, the free play of annature 14 is"

to

-- within bracket hold 21, the free play of armature 14 is -- and

Column 3,
Line 31, should be changed from
"bearing 28 fits within slave bracket hole 24m while second"

to

-- bearing 28 fits within slave bracket hole 24, while second --

Signed and Sealed this

Twenty-eighth Day of October, 2008

JON W. DUDAS
*Director of the United States Patent and Trademark Office*